(12) United States Patent
Nichols

(10) Patent No.: US 11,150,194 B1
(45) Date of Patent: Oct. 19, 2021

(54) LUMINATING GARMENT INSPECTION DEVICE

(71) Applicant: Jim Quentin Nichols, Mansfield, TX (US)

(72) Inventor: Jim Quentin Nichols, Mansfield, TX (US)

( * ) Notice: Subject to any disclaimer, the term of this patent is extended or adjusted under 35 U.S.C. 154(b) by 0 days.

(21) Appl. No.: 16/891,552

(22) Filed: Jun. 3, 2020

(51) Int. Cl.
| | |
|---|---|
| *G01N 21/88* | (2006.01) |
| *D06H 3/02* | (2006.01) |
| *G01M 3/38* | (2006.01) |
| *A62B 17/04* | (2006.01) |
| *A42B 1/04* | (2021.01) |

(52) U.S. Cl.
CPC ........... *G01N 21/8803* (2013.01); *D06H 3/02* (2013.01); *G01M 3/38* (2013.01); *A42B 1/04* (2013.01); *A62B 17/04* (2013.01); *D06H 2201/00* (2013.01)

(58) Field of Classification Search
CPC . G01M 3/38; G01N 2033/0086; G01N 21/88; G01N 21/8803; G01N 21/8901; G01N 21/8914; G01N 21/898; G01N 21/8983; G01N 21/9515; A62B 17/04; A62B 27/00; D06H 3/00; D06H 3/02; D06H 3/04; D06H 3/08; D06H 3/16; D06H 2201/00; D06H 2201/10
USPC .......................... 73/52, 159; 356/237.1–237.6
See application file for complete search history.

(56) References Cited

U.S. PATENT DOCUMENTS

| | | | | |
|---|---|---|---|---|
| 983,320 | A | * | 2/1911 | Snyder ............... G01N 21/8803 356/426 |
| 1,723,058 | A | * | 8/1929 | Napier ...................... A47F 7/10 223/75 |
| 2,485,820 | A | * | 10/1949 | Gilbert ................... G02B 25/02 356/426 |
| 2,567,478 | A | * | 9/1951 | Hartline ................... D06H 3/16 223/1 |
| 2,709,667 | A | * | 5/1955 | Grubb .................. A62B 17/001 442/118 |
| 3,023,940 | A | * | 3/1962 | Schwartz ................. D06H 3/16 223/39 |
| 3,706,913 | A | * | 12/1972 | Malatchi .............. H05B 47/155 315/292 |
| 4,279,508 | A | * | 7/1981 | Everroad ............... G01N 21/88 356/237.1 |
| 4,513,452 | A | * | 4/1985 | Rankin, Sr. ........ A41D 13/0053 2/8.1 |
| 5,046,844 | A | * | 9/1991 | Milton ................... B65G 47/61 356/238.1 |

(Continued)

FOREIGN PATENT DOCUMENTS

| | | | |
|---|---|---|---|
| CN | 202695172 U | * | 1/2013 |
| CN | 207096125 U | * | 3/2018 |

(Continued)

*Primary Examiner* — Gordon J Stock, Jr.

(74) *Attorney, Agent, or Firm* — Law Office of Jeff Williams PLLC; J. Oliver Williams

(57) ABSTRACT

A luminating protective hood inspection device includes a luminating device within a designated inspection zone where a garment can be viewed. A transparent dome for the garment "protective hood" can be fit over to simulate a garment function. A rotating system provides a method where the garment can pass in front of the inspection zone. Various controls are provided including an on/off switch and or brightness control, a foot operated control switch, and a lightweight portable compact frame.

10 Claims, 7 Drawing Sheets

(56) References Cited

U.S. PATENT DOCUMENTS

| | | | | |
|---|---|---|---|---|
| 6,628,807 | B1 * | 9/2003 | Mumelter | G01N 33/367 |
| | | | | 356/237.1 |
| 8,196,454 | B2 * | 6/2012 | Hanson | A62B 27/00 |
| | | | | 73/40.7 |
| 10,478,644 | B2 * | 11/2019 | Leggett | A42B 1/041 |
| 10,502,691 | B1 * | 12/2019 | Packard | G06F 9/543 |
| 2007/0174944 | A1 * | 8/2007 | Grilliot | A42B 3/10 |
| | | | | 2/84 |
| 2019/0350290 | A1 * | 11/2019 | Blake | A42B 1/046 |

FOREIGN PATENT DOCUMENTS

| | | | | | |
|---|---|---|---|---|---|
| DE | 20121789 | U1 * | 6/2003 | | A62B 27/00 |
| EP | 0050516 | A1 * | 4/1982 | | D06H 3/16 |
| EP | 0529621 | A1 * | 3/1993 | | D06H 3/16 |
| GB | 278319 | A * | 11/1927 | | D06H 3/16 |
| GB | 325758 | A * | 2/1930 | | D06H 3/16 |
| GB | 1144639 | A * | 3/1969 | | D06H 3/16 |
| GB | 1186684 | A * | 4/1970 | | D06H 3/16 |
| GB | 1251092 | A * | 10/1971 | | D06H 3/16 |
| GB | 1392293 | A * | 4/1975 | | D06H 3/16 |

\* cited by examiner

LUMINATING GARMENT INSPECTION DEVICE

BACKGROUND OF THE INVENTION

1. Field of the Invention

The present application pertains to a method and evaluation apparatus for detecting flaws in protective hoods commonly worn by firefighters and other safety personal that meets or exceeds the requirements specified in NFPA "The National Fire Protection Association" 2020 standards. The invention is targeted for but not limited to the use with particulate hoods used by first responders to block carcinogenic particles from the head and neck area. Usability, portability, versatile, safety and affordability are incorporated into this invention.

2. Description of Related Art

Standards for the inspection of protective hoods is called out in the 2020 NFPA "National Fire Protection Association" codes and standards. Section 1851 standard deals with the selection, care and maintenance of protective ensembles for structural firefighting and proximity firefighting. Chapter 12 deals specifically with protective hood inspection. To follow the standards used for fire-fighting garment inspection, luminating devices are used for inspecting garments for flaws, consistency, wear and defects. Existing luminating devices consist of flashlights, light tables and other common lighting devices. In each case the luminating device is placed or moved parallel to the garment on one side of the garment. Viewing the garment form the opposite side, the garments consistency and inconsistency in the form of flaws, ware or defects can be identified.

Garment inspection using this method is inconsistent as the luminating devices varies in size and brightness (lumens), as well as the location or distance of the luminating device from the garment. Inspections are awkward and time consuming, generally limited in scope. These variables carry over to inconsistent inspection results. Luminating devices are widely available and can be used with any garment calling for this type of inspection with some success. Disadvantages are that many variables introduced in the inspection process such as the type, size, strength of light source, location or distance between garment and light source and inconsistences between inspectors.

Although strides have been made, shortcomings remain. It is desired that an assembly be provided that provides an improvement on the method for the inspection of protective hoods by eliminating inconsistencies and making the process more reliable.

BRIEF SUMMARY OF THE INVENTION

This present application discloses a method and apparatus that contains some similar features to that of the prior art but focuses to improve consistency, increase user experience, provide some unique use of mechanical concepts and targeted inspection use. In one embodiment the invention provides a luminating device mounted in a fixed location inside a head shaped dome with a reflector directing light to a specific area or inspection zone. The lumen value or brightness can be varied to provide easy detection of flaws, wear and defects in the garment. A transparent dome is used to simulate the shape of human head providing a realistic environment that the protective hood can be easily slid over. A light blocking system to cover the face opening in hood. The transparent dome is mounted to a rotating base and that covers the luminating device is smooth for easy cleaning. The dome may rotate 360 degrees independent of the fixed luminating device so with a hood in place it can be rotated through the inspection zone. A foot switch that controls the luminating device aids in keeping the operator's hands free. A goal is to prolong the life of luminating device and make the inspection process more efficient.

Ultimately the invention may take many embodiments. In these ways, the present invention overcomes the disadvantages inherent in the prior art. The more important features have thus been outlined in order that the more detailed description that follows may be better understood and to ensure that the present contribution to the art is appreciated. Additional features will be described hereinafter and will form the subject matter of the claims that follow.

Many objects of the present application will appear from the following description and appended claims, reference being made to the accompanying drawings forming a part of this specification wherein like reference characters designate corresponding parts in the several views.

Before explaining at least one embodiment of the present invention in detail, it is to be understood that the embodiments are not limited in its application to the details of construction and the arrangements of the components set forth in the following description or illustrated in the drawings. The embodiments are capable of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the various purposes of the present design. It is important, therefore, that the claims be regarded as including such equivalent constructions insofar as they do not depart from the spirit and scope of the present application.

BRIEF DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
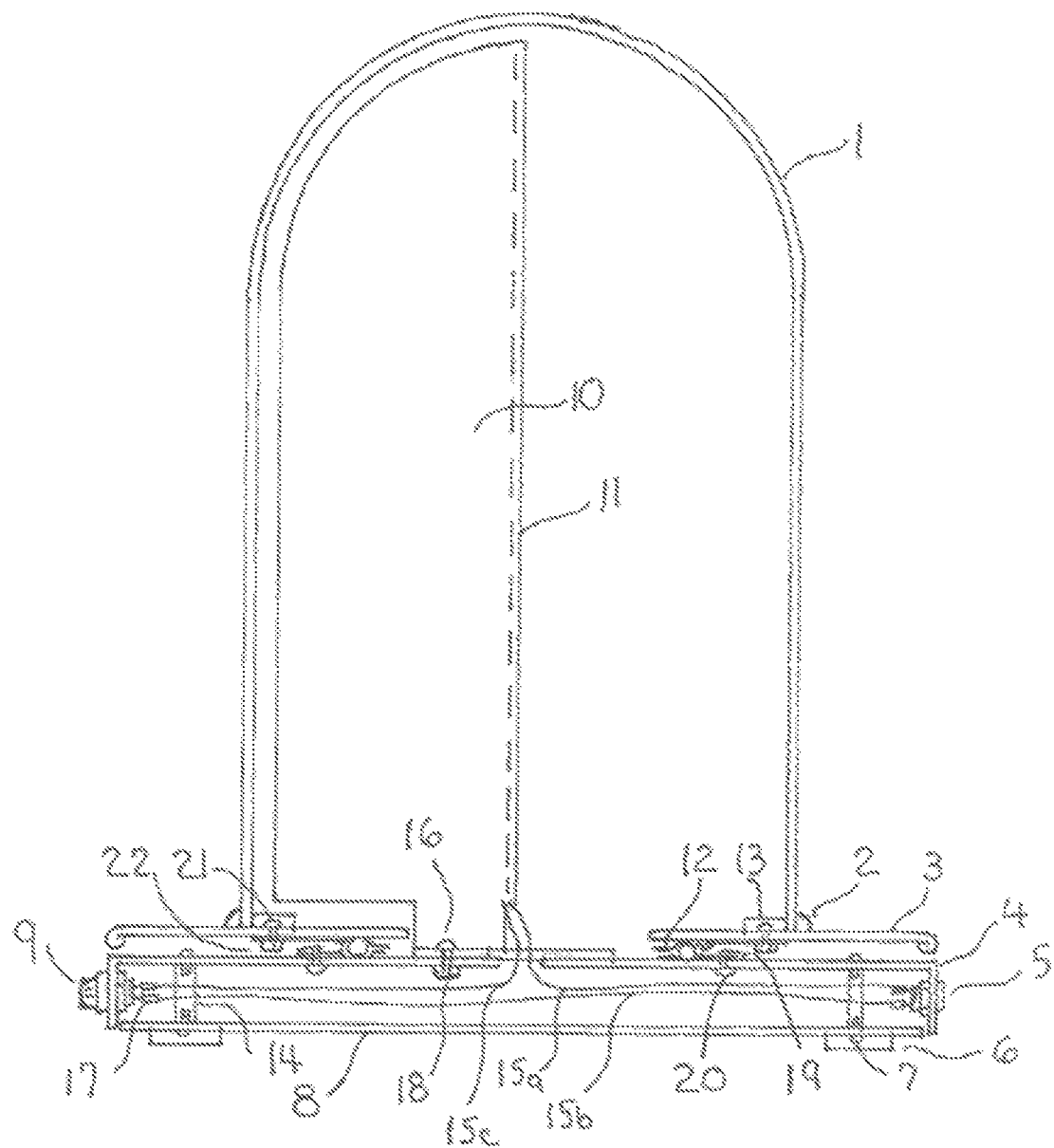
FIG. 1 is a side perspective view of a first embodiment of a luminating firefighter protective hood inspection device according to an embodiment of the present application.

While the embodiments and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE INVENTION

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the embodiments described herein may be oriented in any desired direction.

The embodiments and method will be understood, both as to its structure and operation, from the accompanying drawings, taken in conjunction with the accompanying description. Several embodiments of the assembly may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

Referring now to the Figures wherein like reference characters identify corresponding or similar elements in form and function throughout the several views. The following Figures describe embodiments of the present application and its associated features. With reference now to the Figures, embodiments of the present application are herein described. It should be noted that the articles "a", "an", and "the", as used in this specification, include plural referents unless the content clearly dictates otherwise.

The following callouts found in the drawings will be associated with the corresponding parts:
1. Transparent dome
2. Silicon adhesive
3. Platform
4. Base
5. Male power connector
6. Rubber foot
7. Mounting screw
8. Base cover plate
9. Brightness control
10. Light reflector
11. Illuminating device
12. Lazy susan bearing
13. Rubber position spacer
14. Threaded spacer
15. Connecting wires
16. Mounting screws
17. Electrical insulator
18. Locknut
19. J nut
20. Mounting screw
21. Mounting screw
22. Locknut
23. Foot Switch
24. Foot switch AC power connector
25. Power supply
26. Female power supply power connector
27. Inspection Zone
28. Light blocking Mask
29. Garment, protective hood Although the disclosure is detailed and exact to enable those skilled in the art to practice the invention, the physical embodiments herein disclosed merely exemplify the invention which may be embodied in other specific structure. The scope of the invention is defined in the claims appended hereto.

In particular, the invention is a luminating inspection device for protective hoods worn by firefighters and other safety personnel, comprising:
  a) Luminating source;
  b) a transparent dome;
  c) rotating base;
  d) foot switch control;
  e) power supply;
  f) luminating device brightness control; and
  g) hood face opening cover, light mask In the first embodiment discussed in more detail below, the transparent dome provides a simulated head shape that the protective hood covers. In the second embodiment, the inspection zone comprises a portion of the dome where the illumination is directed.

Referring to FIGS. 1 through 7 in the drawings, views of the luminating protective hood inspection device are illustrated. The luminating protective hood inspection device of the invention is illustrated. As illustrated, the device has an inspection area 27 (FIG. 2) for the viewing of the garment placed over the dome 1 (see FIG. 4). Preferably the inspection zone 27 (FIG. 2) encompasses the full height of the dome 1 (FIG. 4) but may only be sized to partially cover the dome 1.

The luminating protective hood inspection device uses any type of light emitting component. An example of a preferred component is a LED "light emitting diode" 11 (FIG. 2) configuration. The light emitting component provides an even display of lumens in the inspection zone 27.

Figure 2:
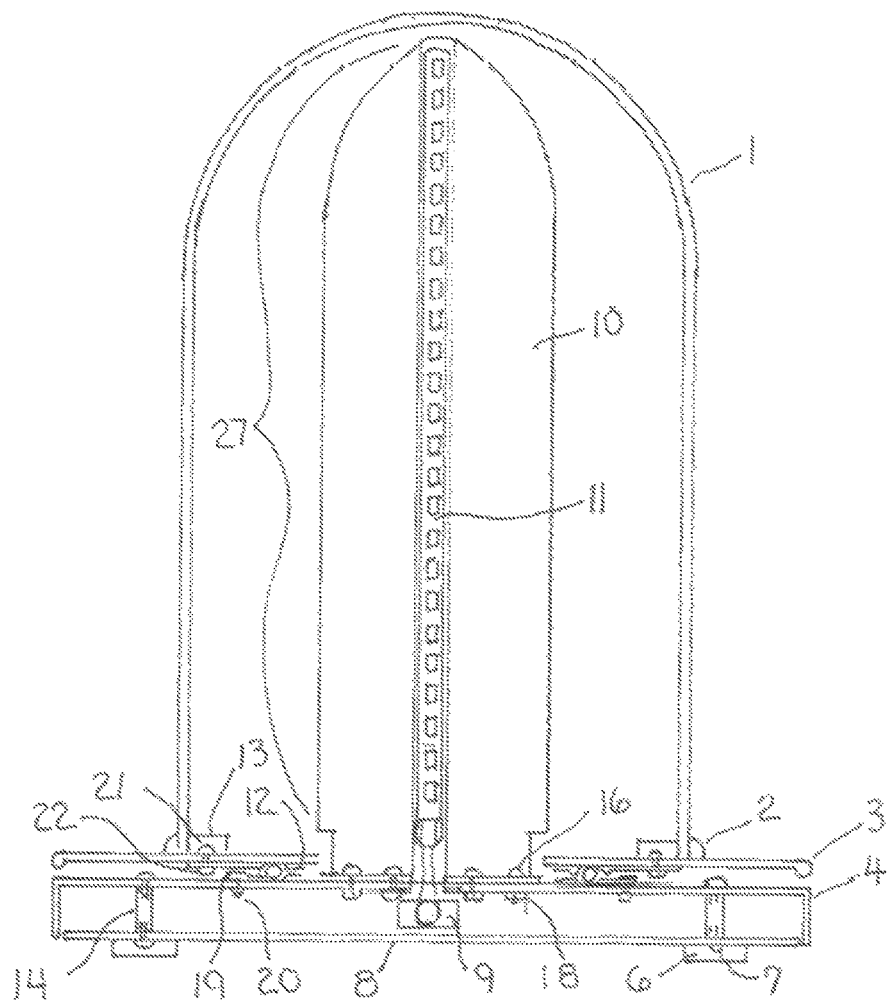
FIG. 2 is a front perspective view of the luminating firefighter protective hood inspection device of FIG. 1 showing the reflector with the luminating device in position for the inspection area.
Figure 4:
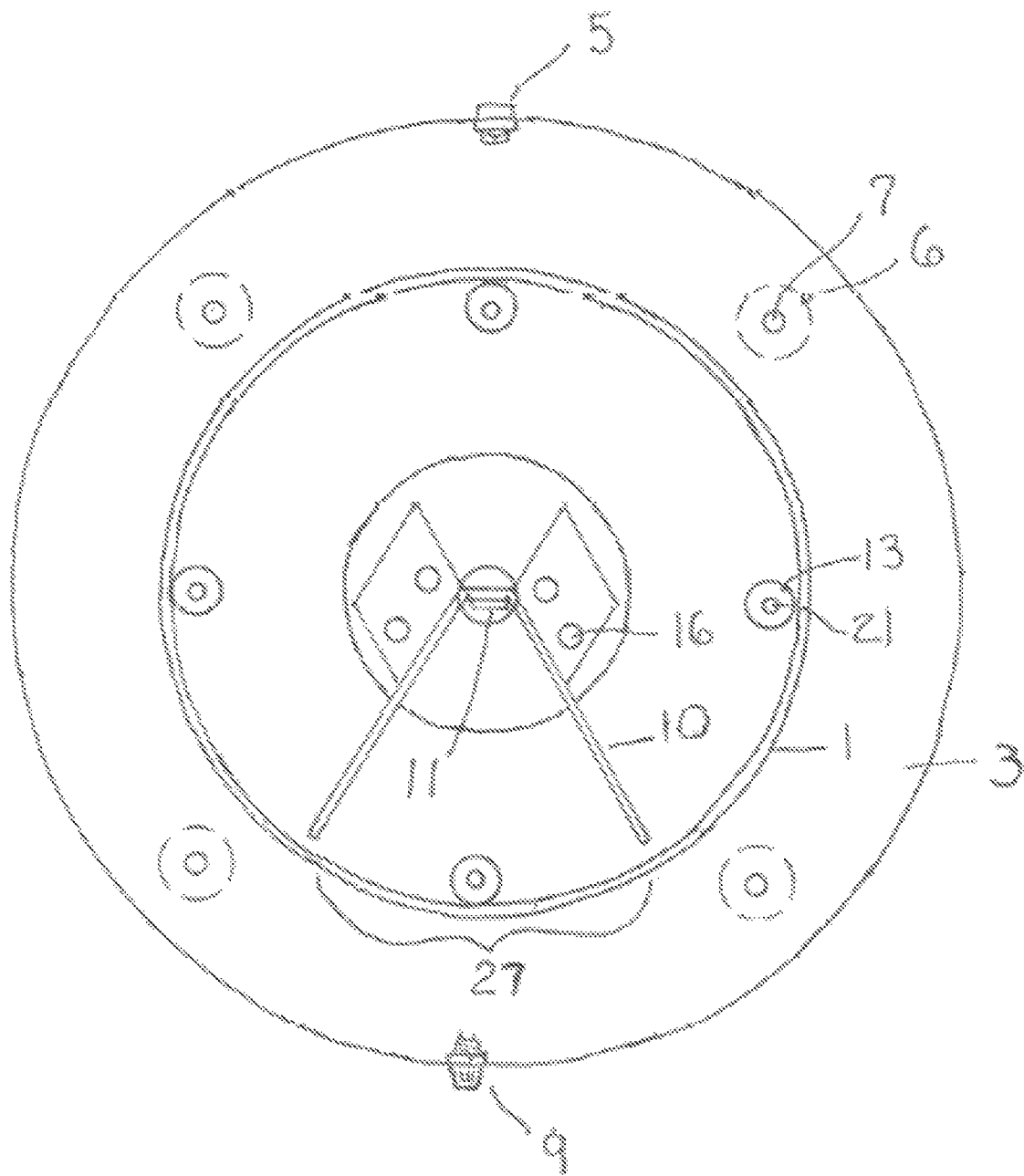
FIG. 4 is a top view of the luminating firefighter protective hood inspection device of FIG. 1 showing the reflector with the luminating device in position for the inspection area.

A reflector 10 (FIG. 2) reflects and focuses the light to a designated area within inspection zone 27 (FIG. 4). Both the luminating device 11 (FIG. 2) and reflector 10 (FIG. 2) are secured to the device's base 4 (FIG. 2). The transparent dome 1 (FIG. 2) that incapsulates the luminating device 11 (FIG. 2) and the reflector 10 (FIG. 2) is fixed to the rotating platform 3 (FIG. 2). The platform 3 (FIG. 2) mounted to lazy-susan bearing assembly 12 (FIG. 2) that permits the dome 1 (FIG. 2) to rotate independent of the luminating device 11 (FIG. 2) and the reflector 10 (FIG. 2). It is understood that reflector 10 may be used as a heat sink to aid in dispersing heat. One or more types of ventilation may be used with dome 1, reflector 10, and device 11. An additional heat sink material could be included with reflector 10 as well.

The base 8 (FIG. 2) may include a plurality of feet (i.e. four rubber feet 6) (see FIG. 2) for providing a stable and an antiskid feature to the embodiment.

Figure 3:
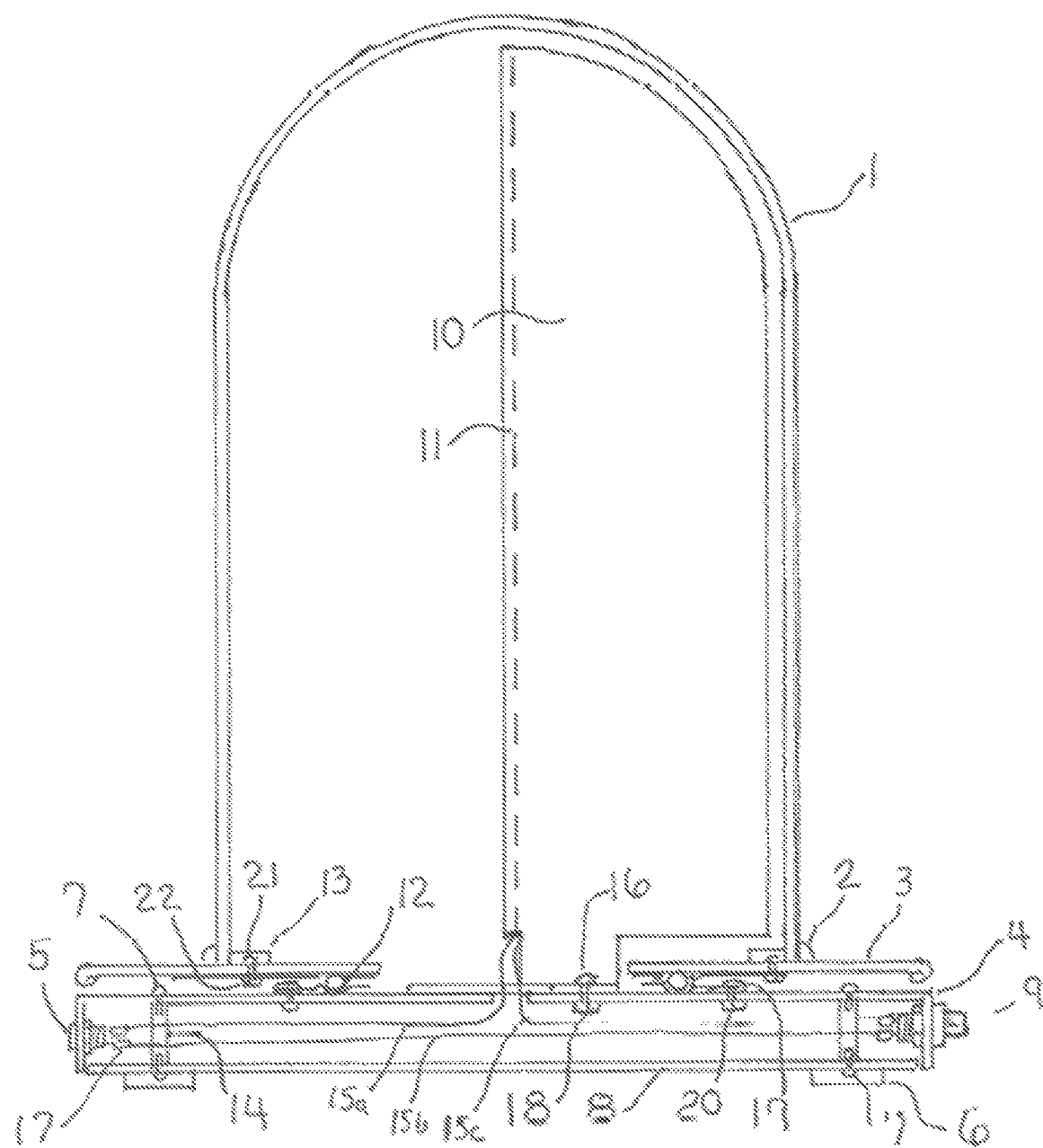
FIG. 3 is a side view of the luminating firefighter protective hood inspection device of FIG. 1.

A male electrical power connector 5 (FIG. 3) located on back side of the base 4 (FIG. 3) is for connecting the electrical power for the luminating device 11 (FIG. 2). The male connector 26 (FIG. 5) on the power supply 25 (FIG. 5) connects to the power connector 5 (FIG. 3). The power supply 25 (FIG. 5) can be plugged directly to a 120-volt AC wall outlet. In this configuration the on off switch or dimmer control 9 (FIG. 3) is used to turn on device and or brightness level.

Figure 5:
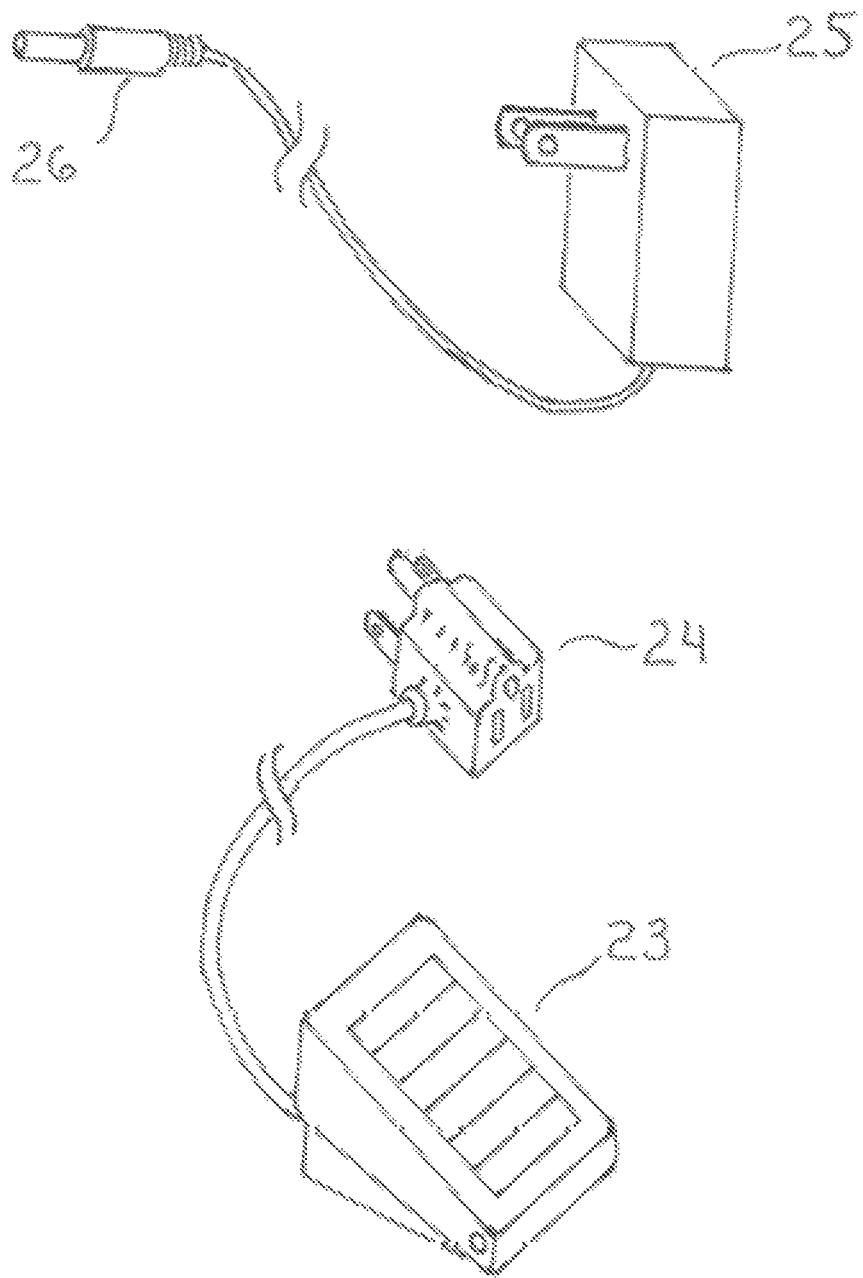
FIG. 5 is a view of the foot switch and power supply used with the luminating firefighter protective hood inspection device of FIG. 1 and their connectors.

The device includes a control interface that may include any of the following: switch control 23, plug 24, power supply 25, and brightness control 9. An optional foot switch control 23 (FIG. 5) can be inserted to free up operators' hands. The foot switch plug 24 (FIG. 5) plugs in to a 120-volt AC outlet. The power supply 25 (FIG. 5) plugs into the back of foot switch AC power connector 24 (FIG. 5). The main power switch 9 (FIG. 3) is located on the front of the base 4 (FIG. 3). A momentary on off foot switch 23 (FIG. 5) provides an option to the operator to control the luminating device during inspection when the brightness control 9 (FIG. 3) is in the on position. The brightness is adjusted according to type of protective hood being inspected. Adjustment of switch 23 can regulate the amount of light emitted. It should be understood that operation of foot switch control 23 can be used in a manner to aid in the control of heat distribution by adequately regulating the time and duration of device 11.

To use the invention in the preferred embodiments shown herein, the following items are optionally required:
a) Access to a 120-volt AC outlet. It is understood that any type of electrical power source may be uses, such as a battery providing direct current or a power source providing alternating currently. Where batteries are used, such batteries may be rechargeable.
b) Convenient location for test, such as a table or countertop etc.

Figure 6:
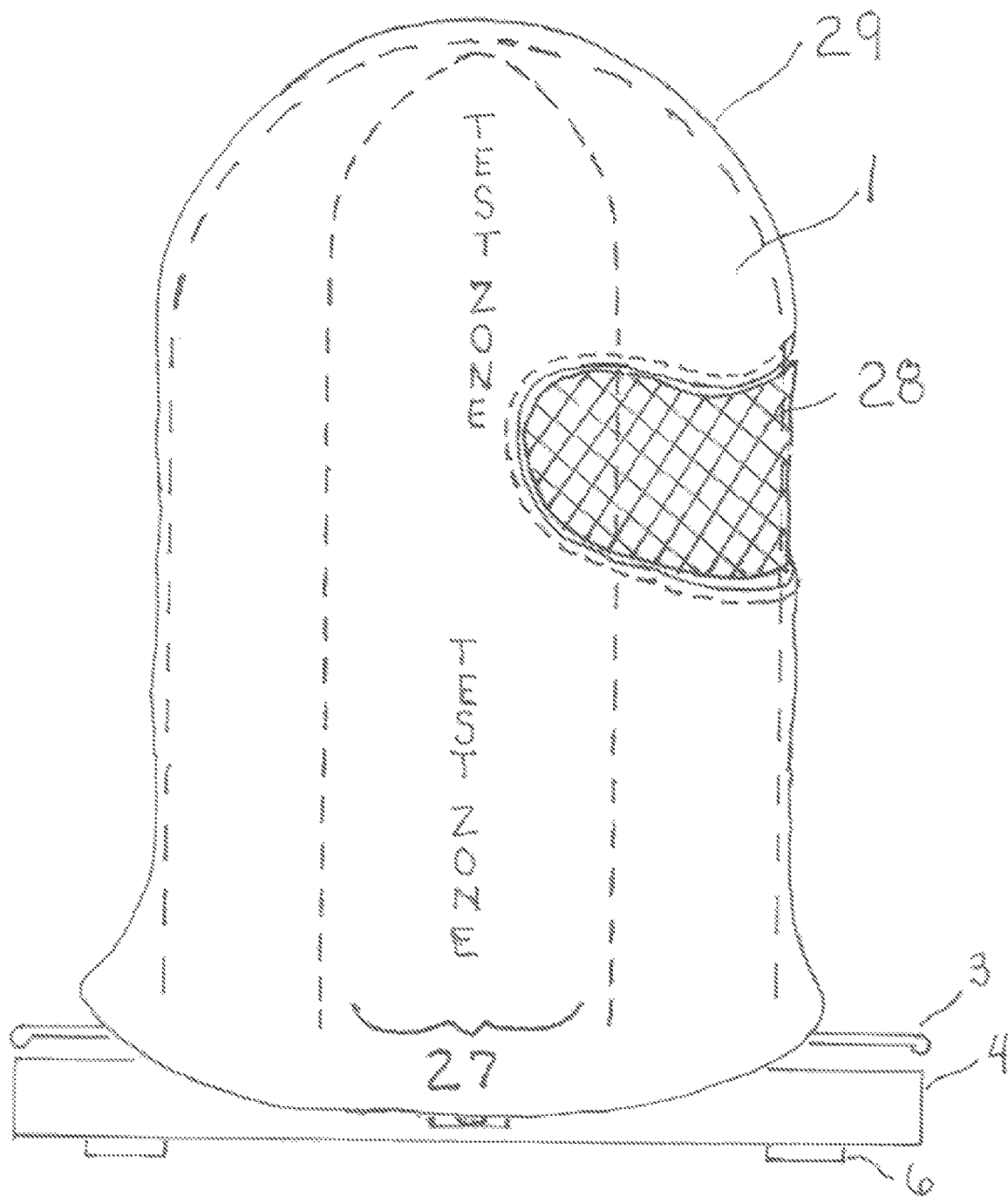
FIG. 6 is a view of the invention with a protective hood in place for inspection.
Figure 7:
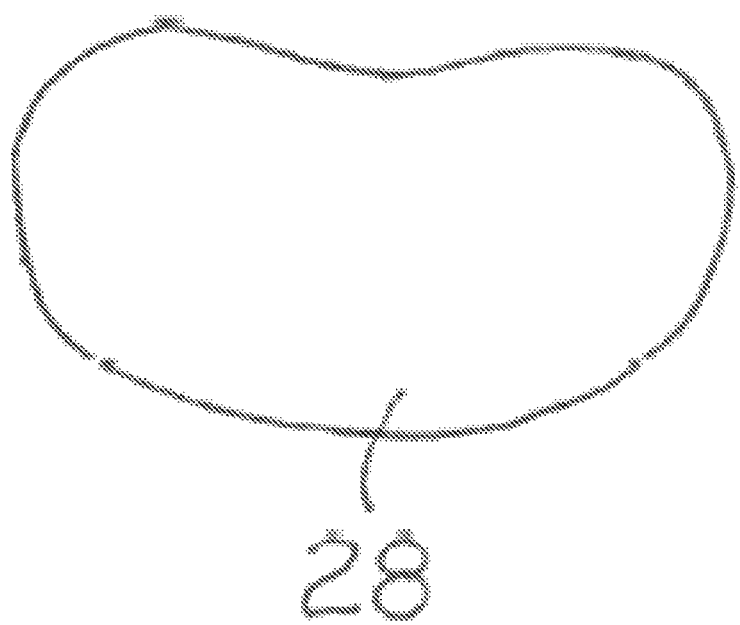
FIG. 7 is a view a light blocking device used to cover a hood face opening in the protective hood of FIG. 6.

To operate the invention, preforming a visual inspection of a protective hood:
1. Place invention on a stable surface, tabletop or countertop.
2. Plug foot switch AC power connector 24 (FIG. 5) in to a 120-volt AC wall outlet.
3. Plug power supply 25 (FIG. 5) into the back of foot switch AC power connector 24 (FIG. 5).
4. Plug female power supply connector 26 (FIG. 5) into the male power connector 5 (FIG. 3) located on the back side of the base 4 (FIG. 3).
5. While pressing the foot switch 23 (FIG. 5) adjust brightness control 9 (FIG. 3) located on base 4 (FIG. 3) to midrange. The luminating devices 11 (FIG. 4) will turn on and remain on while the foot switch 23 (FIG. 5) is pressed.
6. Releasing the pressure off the foot switch 23 (FIG. 5) will interrupt power and the luminating devices 11 (FIG. 2) will turn off.
7. Identify garment "protective hood" to be inspected.
8. Carefully slide protective hood over dome 1 (FIG. 6) as indicated in FIG. 6.
9. Make sure the hood face opening is in proper position for domes with a fixed hood face opening light blocker.
10. For domes without a fixed light blocker, place light mask 28 (FIG. 5) over hood face opening as indicated in FIG. 6.
11. Press the foot switch 23 (FIG. 5) to turn on the luminating devices 11 (FIG. 2)
12. While maintaining pressure on foot switch 23 (FIG. 5) view the protective hood with in the luminate inspection zone 27 (FIG. 4).
13. Adjust the brightness of the light using the brightness control 9 (FIG. 9) to a comfortable level, bright enough to detect defects and low enough for eye comfort. Protective hoods come in a variety of designs and materials so brightness adjustments may be required different protective hoods are inspected.
14. Slowly rotate hood 29 (FIG. 6) 360 degrees while viewing the inspection zone 27 (FIG. 4).
15. Note any and all faults, defects, ware spots, holes and tears identified with in the luminated inspection zone 27 (FIG. 4).
16. Faults, defects, ware spots, holes and tears should be noted on an inspection sheet and or marked on the hood for future reference.
17. Once a 360-degree inspection of the protective hood has been completed release pressure on foot switch 23 (FIG. 5) turning off the luminating device 11 (FIG. 4).
18. Remove the light mask 28 (FIG. 6) for later use.
19. Remove the protective hood 29 (FIG. 6) from dome 1 (FIG. 6) by carefully sliding it off the dome 1 (FIG. 6).
20. A protective hood with identified faults, defects, ware spots, tears and holes should be taken out of service.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A luminating protective hood inspection device for a garment, comprising:
a luminating device coupled to a base;
a transparent dome coupled to the base and surrounding the luminating device, the transparent dome configured to simulate a garment function;

a designated inspection zone within the transparent dome where the garment can be viewed;

a rotating system coupled to the base and configured to permit rotation of the transparent dome relative to the luminating device, whereby the garment can pass through the inspection zone; and a power switch coupled to the base and configured to regulate power to the luminating device;

wherein the garment is a hood; and the luminating protective hood inspection device further comprising a light blocking device covering a face opening of the hood.

2. The luminating protective hood inspection device of claim 1, wherein the luminating device is a low voltage LED luminating device.

3. The luminating protective hood inspection device of claim 1, further comprising:

a reflector that focuses the lumens generated from the luminating device to the inspection zone.

4. The luminating protective hood inspection device of claim 1, further comprising:

a foot switch control to regulate power to the luminating device.

5. The luminating protective hood inspection device of claim 4, wherein the foot switch control to reduce eye strain and prolong luminating device life.

6. A method of inspecting a garment with a luminating device, comprising:

obtaining the luminating protective hood inspection device of claim 1;

identifying the garment to be inspected;

orienting the garment over the transparent dome;

engaging at least one control interface to selectively luminate the luminating device;

placing a light mask over an opening of the garment; and rotating the garment relative to the luminating device within the transparent dome so as to view light through the garment.

7. The method of claim 6, further comprising:

adjusting the brightness of the luminating device.

8. The method of claim 6, further comprising:

noting any faults or defects in the garment.

9. The method of claim 6, further comprising:

adjusting the brightness of the luminating device; and noting any faults or defects in the garment.

10. The method of claim 6, further comprising:

wherein the transparent dome rotates about the luminating device.

\* \* \* \* \*